United States Patent [19]

Yoshino

[11] Patent Number: 5,200,992
[45] Date of Patent: Apr. 6, 1993

[54] COMMUNICATION APPARATUS HAVING CHANGEABLE COMMUNICATION PROCEDURE SIGNALS

[75] Inventor: Motoaki Yoshino, Kawasaki, Japan

[73] Assignee: Canon Kabushiki Kaisha, Tokyo, Japan

[21] Appl. No.: 820,024

[22] Filed: Jan. 13, 1992

Related U.S. Application Data

[63] Continuation of Ser. No. 544,654, Jun. 27, 1990, abandoned.

[30] Foreign Application Priority Data

Jun. 30, 1989 [JP] Japan .................................... 1-66725

[51] Int. Cl.⁵ ........................................... H04M 11/00
[52] U.S. Cl. ........................................ 379/93; 379/97
[58] Field of Search ............... 379/210, 211, 212, 213, 379/386, 373, 376, 201, 157, 164, 265, 266, 89, 93, 96-98, 100

[56] References Cited

U.S. PATENT DOCUMENTS

| | | | |
|---|---|---|---|
| 4,436,962 | 3/1984 | Davis et al. | 379/211 |
| 4,582,957 | 4/1986 | Hayes et al. | 379/376 |
| 4,639,553 | 1/1987 | Kiguchi | 379/100 |
| 4,646,347 | 2/1987 | Liu | 379/375 |
| 4,663,778 | 5/1987 | Takahashi | 379/100 |
| 4,677,660 | 6/1987 | Yoshida | 379/100 |
| 4,746,986 | 5/1988 | Tanigawa | 379/100 |
| 4,747,124 | 5/1988 | Ladd | 379/212 |
| 4,783,796 | 11/1988 | Ladd | 379/212 |
| 4,788,714 | 11/1988 | Hashimoto | 379/100 |
| 4,800,439 | 1/1989 | Yoshino | 379/100 |
| 4,815,121 | 3/1989 | Yoshida | 379/100 |
| 4,823,375 | 4/1989 | Yoshida | 379/100 |
| 4,829,559 | 5/1989 | Izawa et al. | 379/100 |
| 4,837,806 | 6/1989 | Watanabe | 379/100 |
| 4,843,479 | 6/1989 | Yoshino et al. | 379/100 |
| 4,879,743 | 11/1989 | Burke et al. | 379/212 |
| 4,914,687 | 4/1990 | Maeda | 379/100 |
| 4,916,607 | 4/1990 | Teraichi et al. | 379/100 |
| 4,926,462 | 5/1990 | Ladd et al. | 379/212 |
| 4,932,048 | 6/1990 | Kenmochi et al. | 379/100 |
| 4,989,232 | 1/1991 | Tsumura | 379/100 |

OTHER PUBLICATIONS

H. A. Lanty et al, "No. 1 ESS furnishes ACD service", *Bell Laboratories Record*, vol. 56, No. 3, Mar. 1978, pp. 76–82.

Primary Examiner—James L. Dwyer
Assistant Examiner—Wing F. Chan
Attorney, Agent, or Firm—Fitzpatrick, Cella, Harper & Scinto

[57] ABSTRACT

A communication apparatus for effecting an automatic response in accordance with a call signal supplied from a line comprises a discrimination unit for discriminating types of call signals supplied from the line, and a control unit for effecting a communication protocol which is consistent with the input call signal in accordance with the output of the discrimination unit in an automatic response mode.

8 Claims, 5 Drawing Sheets

F I G. 1
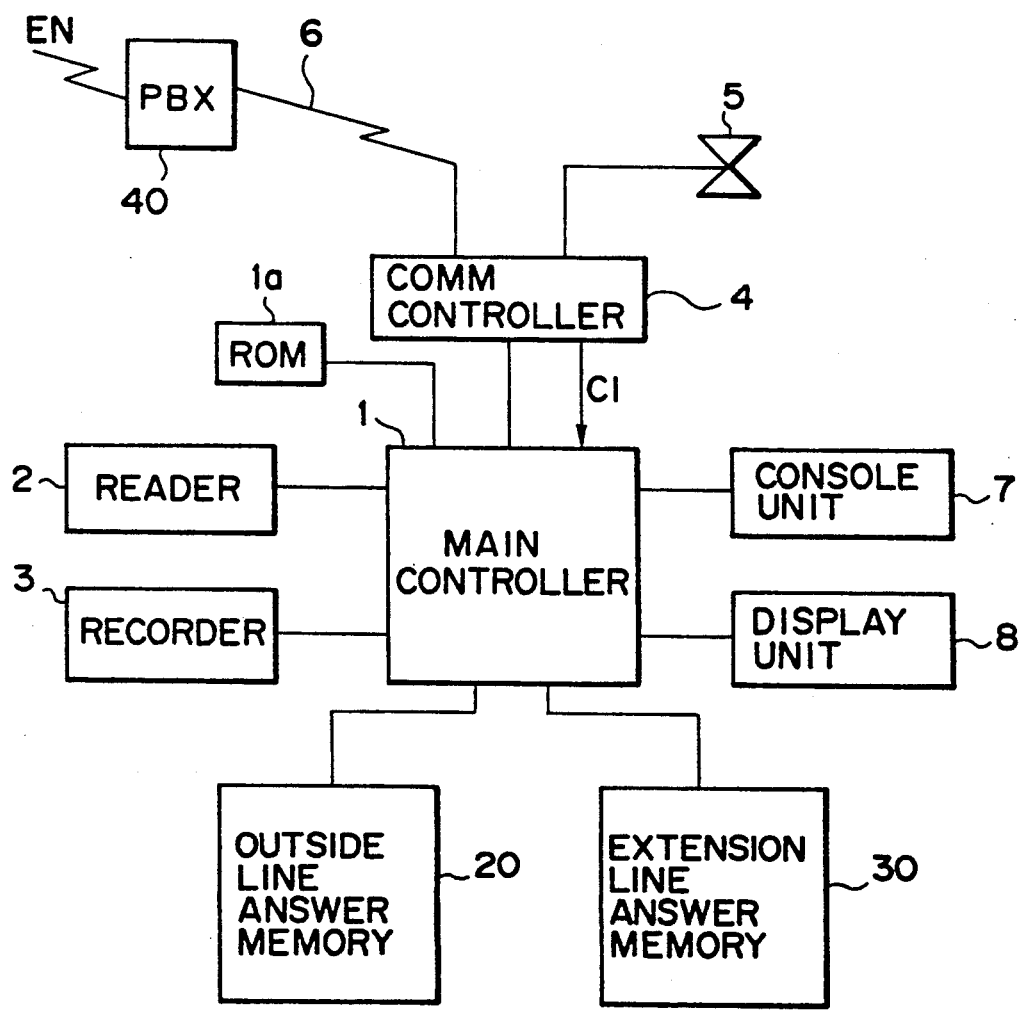

COMMUNICATION APPARATUS HAVING CHANGEABLE COMMUNICATION PROCEDURE SIGNALS

This application is a continuation of application Ser. No. 07/544,654 filed Jun. 27, 1990 now abandoned.

BACKGROUND OF THE INVENTION

1. Field of the Invention

The present invention relates to a communication apparatus, and more particularly to a communication apparatus which automatically responds in response to a call signal supplied from a line connected to the apparatus.

2. Related Background Art

In a prior art communication apparatus such as a facsimile machine, an apparatus having an automatic receiving function which detects a call signal sent from an exchange and automatically starts data reception has been known.

FIG. 5 shows a detection process for a call signal in the prior art. Numeral 41 denotes an original waveform of a call signal which comprises an on-off tone signal of a selected frequency.

In FIG. 5, when the presence or absence of the call signal is detected, a rectangular pulse 42 is generated by detecting a curvature point of an input signal, and the rectangular wave is integrated to produce a waveform 43, which is compared with a predetermined threshold TH to produce a call signal detection signal CI having a waveform 44.

Data on the lengths of the on-period (low level period because of a negative logic) T1 and the off-period T2 of the detection signal CI and a repetition frequency thereof has been previously stored in a memory for the predetermined call signal A control unit of the apparatus determines the reception of the call signal only when the detection signal CI having those parameters is produced. In a simpler method, the call signal is detected when the call signal CI is on for more than a predetermined period.

The prior art call signal detection system is sufficiently effective when only one type of call signal is used. However, when a line and an apparatus are connected through a private branch exchange (PBX), the PBX produces different call signals for a call from an extension line and a call from an external line (public line) but the prior art apparatus cannot discriminate the difference in the call signals.

Namely, in the prior art communication apparatus, the parameters such as the on/off time and the repetition frequency of the call signal detection signal CI are fixed. Thus, if those parameters are fit to the waveform of the call signal from the external line generated by the PBX, the automatic response to the call from the extension line is not attained. Conversely, if they are fit to the waveform of the call signal from the extension line, the automatic response to the call from the external line is not attained.

The techniques to respond by the detection of call are disclosed in the U.S. Pat. Nos. 4,677,660, 4,823,375, 4,815,121, 4,800,439, 4,843,479, 4,837,806 4,663,788, 4,916,607 and 4,932,048.

SUMMARY OF THE INVENTION

It is an object of the present invention to improve a communication apparatus to overcome the above problems.

It is another object of the present invention to provide a communication apparatus which discriminates different types of call signals to execute a process in accordance with the detected call signal.

It is another object of the present invention to provide a communication apparatus which discriminates call signals from an extension line exchange and an external line exchange and executes a communication process in accordance with the call from the extension line or the external line.

The other objects of the present invention will be apparent from the following detailed description and, drawings of the preferred embodiments.

BRIEF DESCRIPTION OF THE DRAWINGS

FIG. 1 shows a block diagram of a facsimile machine in one embodiment,

DETAILED DESCRIPTION OF THE PREFERRED EMBODIMENTS

Figure 2A:
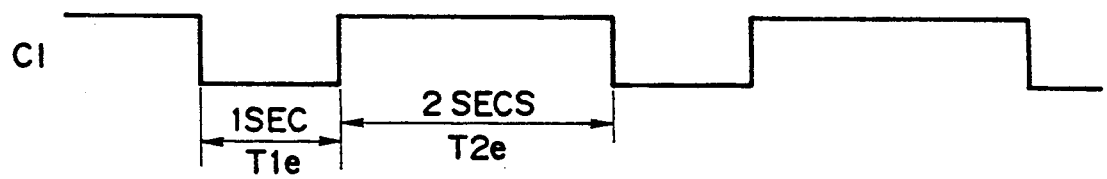
FIGS. 2A and 2B show waveforms of call signal detection signals which are discriminated by the apparatus of the embodiment.

One embodiment of the present invention is now explained in detail with reference to the drawings.

FIG. 1 shows a block diagram of a facsimile machine in accordance with the present invention.

In FIG. 1, numeral 1 denotes a main controller comprising a microprocessor. A system bus of the main controller 1 which comprises an address bus and a data bus is connected with the following units. The main controller 1 controls an overall apparatus in accordance with a program stored in a ROM 1a.

A reader 2 comprises a CCD line sensor and a document sheet feeder and is used to read a document image.

A recorder 3 comprises a thermal printer and is used to record a received image or an image read by the reader 2 in a document copy mode.

A communication controller 4 comprises a modem, an NCU and a call signal detector, and sends and receives a protocol signal and an image signal through a line 6 such as a telephone line (extension line from a private branch exchange 40). A telephone set 5 for manual line control or speech is connected to the communication controller 4.

A private branch exchange 40 is of known configuration, connects an extension line 6 with an external line EN, and provides different call signals to the communication controller 4 through the extension line 6 for a call from other extension line terminal and a call from the external line EN.

A console unit 7 comprises an LCD display and a keyboard including a ten-key and function keys. A display unit 8 comprises an LCD display and is used to display a current time and an operation status.

Figure 5:
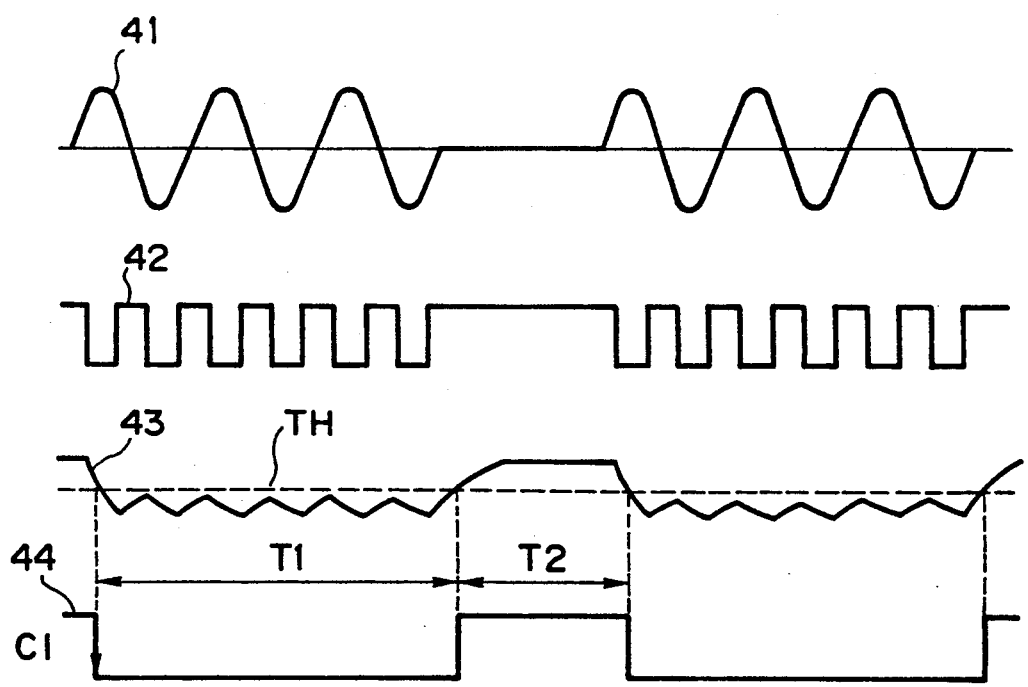
FIG. 5 shows a waveform for a prior art call signal detection system.

The above configuration is same as that of a known facsimile machine. In the present embodiment, the communication controller 4 generates a call signal detection signal CI shown at the bottom of FIG. 5 in a method shown in FIG. 5, and supplies it to the main controller 1 through an input port (not shown).

The private branch exchange supplies to the communication controller 4 a different call signal depending on whether the call is from the external line or the extension line. The main controller 1 discriminates the pattern of the detection signal CI to determine whether the call is from the extension line or the external line, and sends back different information to the calling station in the automatic response mode. As an example of the automatic response, let us consider the transmission of a CSI (called station identification) signal to be sent to a calling station.

In FIG. 1, numeral 20 denotes a data memory for responding to an external (or outside) line call, and numeral 30 denotes a data memory for responding to an extension line call. The on-times, off-times and the numbers of times of repetition of the on/off cycle (the number of times of waveform detection) of the call signals supplied from the private branch exchange 40 when they are received from the external line and the extension line are stored in the memories 20 and 30, respectively, as parameters.

Figure 2B:
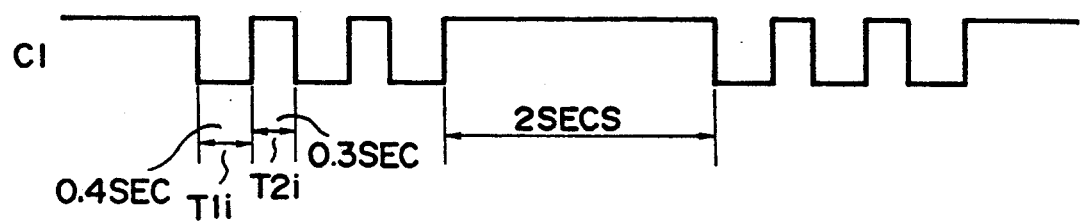

FIGS. 2A and 2B show waveforms of the detection signals CI for the call signals supplied from the private branch exchange 40 when the calls are received from the external line and the extension line, respectively.

As shown in FIG. 2A, for the call from the external line, the private branch exchange 40 supplies a call signal which is a repetition of 1-second on-time T1e and a 2-second off-time T2e, as shown in FIG. 2A. On the other hand, for the call from the extension line, it supplies a call signal with is a repetition of 0.4-second on-time T1i, 0.3-second off-time and 2-second interruption (off-time), as shown in FIG. 2B.

The on-times and off-times (T1e, T2e, T1i, T2i) corresponding to the above detection signals are stored in the memories 20 and 30 as detection parameters. Further, one time for the external line and two times for the extension line are stored in the memories 20 and 30 as the numbers of times of wave detection.

An external line number (including an area code and a telephone number) of the apparatus is stored in the memory 20 and an extension line number (about four digits) is stored in the memory 30 as the telephone number of the called station to be included in the CSI signal to be sent back to the calling station in the automatic receive mode.

Figure 3:
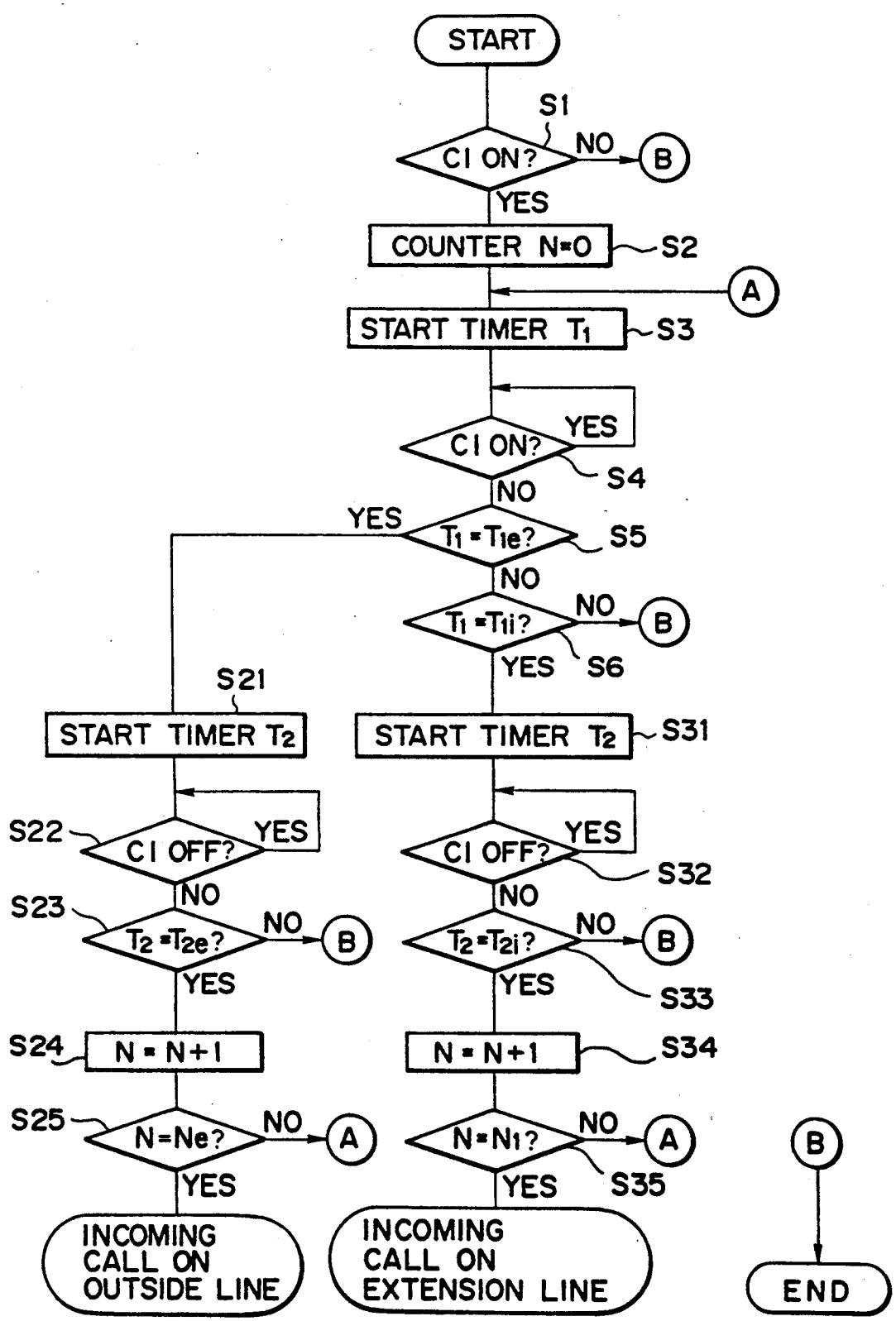
FIG. 3 shows a flow chart of a receive control process by a main controller 1 of the apparatus.

An operation in the above configuration is now explained with reference to a flow chart of FIG. 3. FIG. 3 shows a receive control process of the controller 1 of FIG. 1. The process shown is stored in the ROM 1a as a control program of the main controller 1. A timer T and a counter N constructed by hardware or software are used to execute the process.

In a call detection in monitoring (or waiting for) the call, the main controller 1 waits until the call detection signal CI supplied from the communication controller 4 is turned on, in a step S1. When the detection signal CI is turned on, the process proceeds to a step S2 to reset the counter N. In a step S3, the timer T1 is started.

In a step S4, whether the detection signal CI is on or not is checked again. When the detection signal CI is off, whether the content of the timer T1 is equal to the parameter T1e stored in the memory 20 or not is determined in a step S5. If the decision in the step S5 is affirmative, the process proceeds to a step S21, and if the decision is negative, the process proceeds to a step S6.

In the step S6, the content of the timer T1 is compared with the parameter T1i stored in the memory 30. If they are equal, the process proceeds to a step S31, and if they are not equal, the detection process is terminated.

In the step S5, if the content of the timer T1 is equal to the on-time T1e of the detection signal CI when the call is received from the external line, the measurement of the off-time is started in a step S21.

In the step S21, the timer T2 is started. In a step S22, the continuation of the off-state of the detection signal CI is detected. If the detection signal CI is again turned on, the process proceeds to a step S23. In the step S23, whether the content of the timer T2 is equal to the parameter T2e stored in the memory 20 or not is determined. If they are equal, the process proceeds to a step S24, and if they are not equal, the detection process is terminated.

In the step S24, the counter N is incremented. In a step S25, whether the content of the counter is equal to the number of times Ne of the waveform detection stored in the memory 20 or not is determined. If the decision in the step S25 is affirmative, it is determined as the call from the external line. If the decision in the step S25 is negative, i.e., the content of the counter is not equal to the parameter Ne of the memory 20 in the step S25, the process beginning with the step S3 is repeated.

On the other hand, if the content of the timer T1 is equal to the parameter T1i stored in the memory 30 in the step S6, the measurement of the off-time of the detection signal CI by the timer T2 is started in a step S31.

Namely, in the step S31, the timer T2 is started. In a step S32, the turn-off of the detection signal CI is monitored. In a step S33, whether the content of the timer T2 is equal to the parameter T2i in the memory 30 or not is determined. If they are not equal, the detection process is terminated, and if they are equal, the counter N is incremented in a step S34. In a step S35, the content of the counter N is compared with the number of times Ni of the waveform detection stored in the memory 30. If they are equal, it is determined that the call is from the extension line, and if they are not equal, the process after the step S3 is repeated.

The process of FIG. 3 is repeated at a predetermined interval by the main controller 1.

Figure 4:
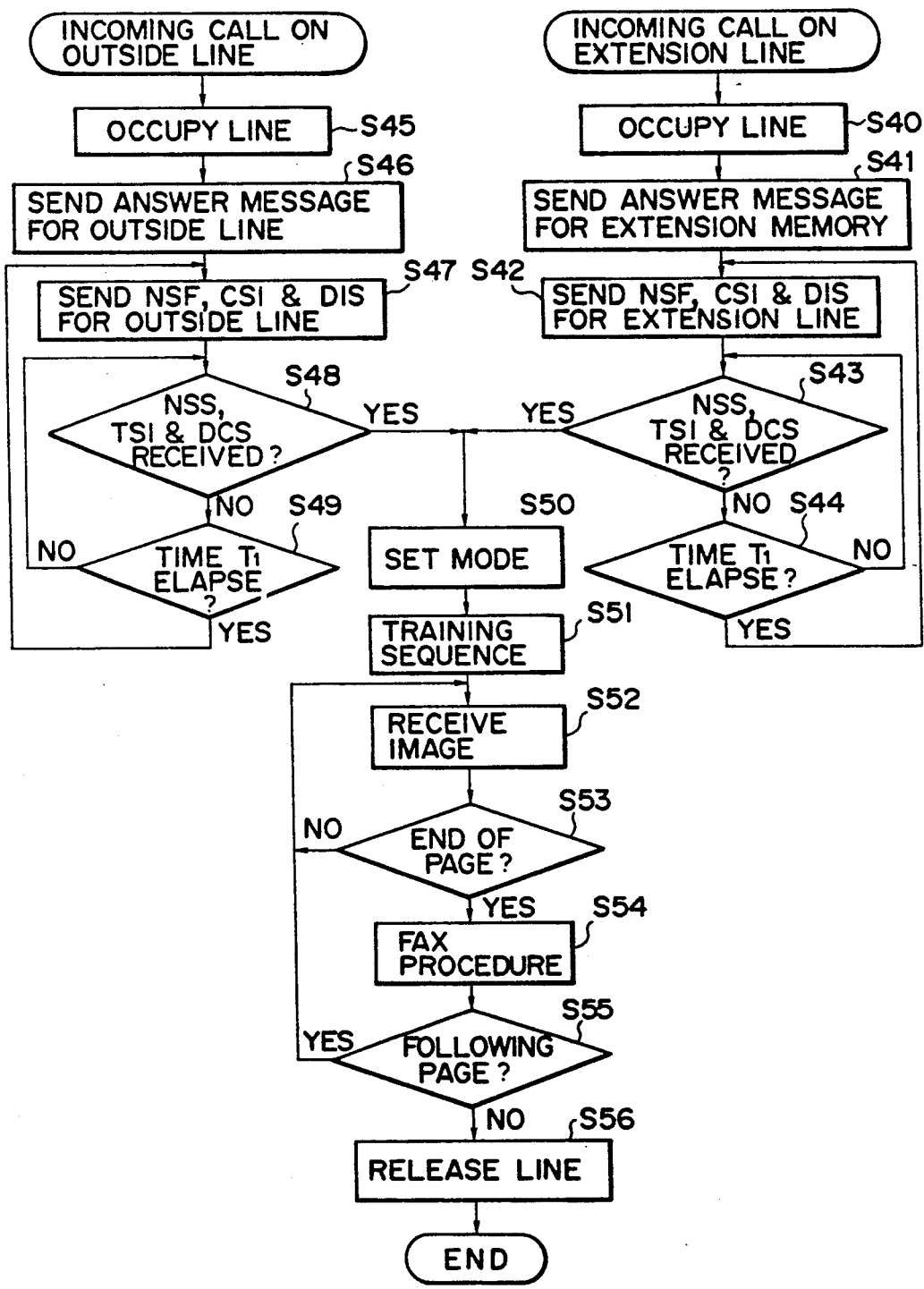
FIG. 4 shows a flow chart of a control process for an automatic response process by the main controller 1.

If the call from the external line or the extension line is detected in the flow chart of FIG. 3, the process proceeds to a flow of FIG. 4 to conduct the facsimile reception.

When the call from the extension line is detected, the process proceeds to a step S40 to form a DC loop of the line 6 to capture the line. In a step S41, a message for an extension line response (for example, "This is extension number oooo. Facsimile is currently on connection".) previously stored in the memory for extension line response is sent to the line 6 through the communication controller 4.

In a step S42, the extension line telephone number read from the memory 30 is set to the CSI of the protocol signal, and an abbreviation of the extension line (for example, oo section) is set to the NSF of the protocol signal, and the NSF, CSI and DIS are sent to the line 6. In steps S43 and S44, the NSF, TSI and DCS which are facsimile protocol signals from the destination station are monitored until the timer T1 (about 3-7 seconds) times out. If the NSS, TSI and DCS signals are not received before the timer T1 times out, the process returns to the step S42 from the step S44 to resend the NCF, CSI and DIS signals. If the NSS, TSI and DCS signals are received, the process proceeds to a step S50 from the step S43.

In the step S50, the receive mode designated by the NSS and the DCS is set. In a step S51, a training sequence is executed in order to check whether the reception in the designated mode is permitted. If the result of the training is good, one page of image data is received in steps S52 and S53, and the received image data is decoded and it is recorded by the recorder 3. When the end of reception of one page is record is detected in a step S53, the facsimile protocol is executed in a step S54. In a step S55, if it is determined that there is a next page in accordance with the result of the protocol, the process returns to the step S52. If there is no next page, the process proceeds to a step S56 and the line is released.

If the call from the external line is detected in the flow of FIG. 3, the line 6 is captured in a step S45. In a step S46, a message for external line response (for example, "This is ΔΔΔ. Facsimile is currently on connection".) previously stored in the memory 20 for the external line response is sent to the line 6.

In a step S47, the external line number of the memory 20 is set to the CSI, abbreviation data of the external line is set to the NSF, and the NSF/CSI/DIS signals are sent to the line 6. In steps S48 and S49, the NSS, TSI and DCS signals are monitored as are in the steps S43 and S44. When the NSS, TSI and DCS signals are received, the process proceeds from the step S48 to a step S50. Thereafter, the same control as that described before is effected.

In the above control, a plurality of detection parameters corresponding to a plurality of call signals are registered and the parameter of the call signal detection waveform under observation is compared with those parameters to detect the coincidence so that the input call signal can be identified. In the subsequent automatic response process, the information corresponding to the input call signal can be sent back to the calling station. The automatic response is effected properly whatever call signal is inputted.

In the present embodiment, the external line and extension line telephone numbers are stored in the memories 20 and 30, respectively. Thus, one of those numbers may be selected in accordance with the result of identification of the call signal and carried by the CSI signal.

In the process of FIG. 3, in order to prevent an infinite loop from being formed during the waiting for a change in the detection signal CI in the step S4, S22 or S34, a 20-second timer may be provided so that an error is detected if the level of the detection signal does not change in a predetermined time and the detection process is immediately interrupted, or in order to prevent a malfunction by a pulsive noise, the proceeding to the next step may be inhibited for an instantaneous change in the detection signal CI such as shorter than 5 milliseconds.

In the comparision process of the timer count in the steps S5, S23 and S33, certain margine (for example, set value±50 milliseconds) may be set taking a measurement error into account. The margin value or upper and lower limit values may be registered in the memory 20 or 30 as separate parameters.

The detection parameters stored in the memories 20 and 30 may be modified by the entry operation from the console panel 7 or by a service man through a dip switch.

In the above embodiment, two types of call signals are supplied. Where more call signals are supplied from the private branch exchange, the detection parameters corresponding to the respective call signals may be stored.

In the above embodiment, the telephone number to be carried by the CSI signal is selected by the call signal. There may be many other data than the telephone number which are to be selected in the automatic response mode. For example, in an apparatus having a voice response function, "This is oo", and for a message for extension line response "This is oo development department." may be registered (recorded on a magnetic tape or digitally recorded) and they are selected in accordance with the call signal.

In the above embodiment, the parameters such as the on/off time and the number of times of repetition of the detection signal for the call signal are used. Alternatively, detection parameters relating to frequency or phase information may be used so long as they permit the discrimination of the type of the call signal.

While the facsimile machine is described in the embodiment, the similar technique is applicable to various communication apparatus such as telephone set or data communication apparatus which is connected to a public telephone line, a lease line or any other line.

The present invention is not limited to the embodiment and various modifications may be made.

I claim:

1. A communication apparatus which sends a predetermined communication procedure signal for data communication, including information for identifying a station of the apparatus, in response to a call signal supplied from a line, the communication apparatus comprising:

means for discriminating a plurality of types of call signals supplied from the line; and control means for changing the identifying information of said predetermined communication procedure signal for data communication in accordance with the discrimination result by said discriminating means.

2. A communication apparatus according to claim 1 wherein said plurality of types of call signals includes a call signal from an extension exchange network and a call signal from a public exchange network.

3. A communication apparatus according to claim 1, further comprising a memory for storing information for identifying a station of the communication apparatus, said information corresponding to the plurality of types of call signals, wherein said control means sets the identifying information of the memory in the communication procedure signal.

4. A communication apparatus according to claim 1 further comprising means for sending a response message, wherein said control means changes the response message in accordance with the call signal.

5. A communication apparatus which sends/receives predetermined communication procedure signals in response to a call signal from a line to execute data communication in accordance with the communication procedure, comprising:
- a detector for detecting various types of call signals from the line;
- a memory for storing response information for identifying a station of the communication apparatus corresponding to the call signals;
- a controller for discriminating a type of call signal detected by said detector, reading the identifying information from the memory corresponding to the call signal, and setting the read identifying information in the communication procedure signal; and
- a communication unit for sending the communication procedure signal to the line.

6. A communication apparatus according to claim 5 wherein said control unit discriminates whether a call signal is from an extension line network or from a public network.

7. A communication apparatus which sends a predetermined procedure signal for data communication, including information for identifying a station of the communication apparatus, in response to a call signal from an extension line network or a public network, said communication apparatus comprising:
- detection means for detecting a call signal from a line;
- a first memory for storing information on a communication procedure corresponding to a call signal from the extension line network;
- a second memory for storing information on a communication procedure corresponding to a call signal from the public network; and
- control means for discriminating a type of the call signal detected by said detection means and changing the identifying information of the predetermined communication procedure signal for data communication in accordance with a discriminated type of the call signal and the information stored in said first or second memory.

8. A communication apparatus according to claim 7, wherein the information on the communication procedure is for identifying a station of the communication apparatus, and the identifying information is changed between a call from the extension line network and the public network, and set in the communication procedure signal.

* * * * *

UNITED STATES PATENT AND TRADEMARK OFFICE
CERTIFICATE OF CORRECTION

PATENT NO. : 5,200,992
DATED : April 6, 1993
INVENTOR(S) : MOTOAKI YOSHINO

It is certified that error appears in the above-identified patent and that said Letters Patent is hereby corrected as shown below:

Title page,
IN [30] FOREIGN APPLICATION PRIORITY DATA

"Jun. 30, 1989 [JP] Japan ........ 1-66725" should read
--Jun. 30, 1989 [JP] Japan ........ 1-166725--.

COLUMN 1

Line 39, "signal" should read --signal.--.
Line 67, "4,663,788," should read --4,663,778,--.

COLUMN 3

Line 37, "with" should read --which--.

COLUMN 6

Line 50, "claim 1" should read --claim 1,--.
Line 61, "claim 1" should read --claim 1,--.

UNITED STATES PATENT AND TRADEMARK OFFICE
CERTIFICATE OF CORRECTION

PATENT NO. : 5,200,992
DATED : April 6, 1993
INVENTOR(S) : MOTOAKI YOSHINO

It is certified that error appears in the above-identified patent and that said Letters Patent is hereby corrected as shown below:

COLUMN 7

Line 16, "claim 5" should read --claim 5,--.

Signed and Sealed this

Twenty-fourth Day of January, 1995

Attest:

BRUCE LEHMAN

*Attesting Officer*     *Commissioner of Patents and Trademarks*